H. R. SAUNDERS.
Combined Treadle and Hand Lever.
No. 218,779.  Patented Aug. 19, 1879.
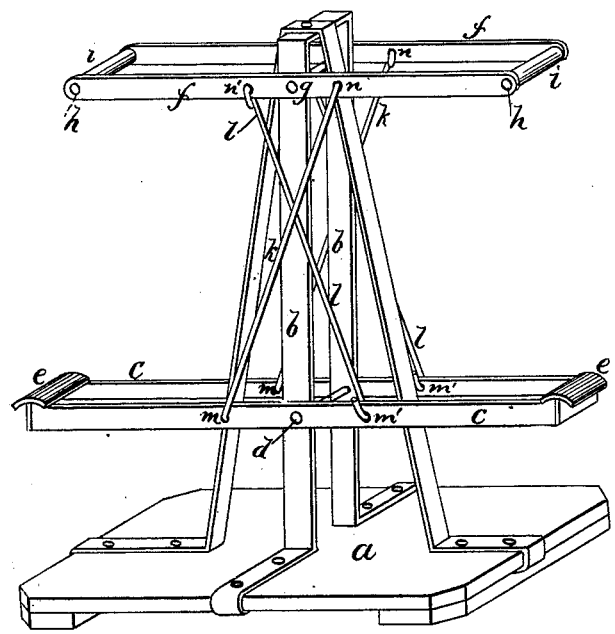
WITNESSES:
INVENTOR:
BY
ATTORNEYS.

UNITED STATES PATENT OFFICE.

HERBERT R. SAUNDERS, OF ST. LOUIS, MISSOURI.

IMPROVEMENT IN COMBINED TREADLE AND HAND-LEVER.

Specification forming part of Letters Patent No. 218,779, dated August 19, 1879; application filed August 14, 1878.

*To all whom it may concern:*

Be it known that I, HERBERT R. SAUNDERS, of St. Louis, State of Missouri, have invented a new and Improved Combined Treadle and Hand-Lever, for utilizing strength and weight in operating pumps, hand-cars, and for other purposes, of which the following is a specification.

My invention is an improvement in the class of apparatus which consist of a treadle and hand-lever, so connected as to work in unison, for transmitting power and operating machinery of various kinds.

The construction and operation of the apparatus are as follows:

In the accompanying drawing I have shown a perspective view of my apparatus adapted for the use of two persons.

$a$ is a platform supporting the standards $b$ $b$. $c$ is a lever hung horizontally near the lower end of standards $b$ by a fulcrum-pin, $d$, that passes through the lever $c$ midway of its length, whereby the lever extends an equal distance each way from its fulcrum.

The lever $c$ is shown double, each part being connected to one standard, $b$, and the two parts are connected together at their ends.

$e$ $e$ are seats or foot-rests, one at each end of lever $c$. These rests consist of curved plates attached to the lever $c$ with their convex side upward.

$f$ is a second lever, hung near the upper end of standards $b$ by a center fulcrum-pin, $g$. This lever $f$ is similar to $c$, except that it is shorter, and the ends of its two parts are connected together by pins $h$, that carry rollers $i$, one at each end of lever $f$. These rollers $i$ will be of convenient size for grasping with the hands of the operator.

$k$ $l$ are rods connecting the levers $c$ and $f$. The rod $k$ is connected to $c$ at one side of fulcrum $d$, as seen at $m$, and to lever $f$ at one side of fulcrum $g$, as seen at $n$; but the points of attachment are at opposite sides of a line through the fulcrums $d$ $g$.

The rod $l$ is connected in the same manner, but at the sides of the fulcrums opposite to $k$, as seen at $m'$ $n'$, whereby the rods $k$ $l$ cross.

I have shown rods $k$ $l$ duplicated or connected similarly to each part of the double levers. The connection may be made by a hook on the end of each rod passing into a hole in the lever, or a pin may pass through an eye on the rod into a hole in the lever.

Chains or straps may be substituted for rods $k$ $l$ and answer the same purposes.

It is evident that if the weight of the operator be applied to one end of lever $c$ that end will be depressed and the end of $f$ on the same side of the standard will be raised. The roller or handle $i$ is then to be grasped by the operator to shift his weight from feet to hands, which will depress that end of lever $f$ and elevate the end of $c$. Then, if the parts are rightly proportioned, the operator can lift with his hands on lever $f$, while his weight is upon $c$, and the operation continued, as described.

The apparatus shown is adapted for a second operator, who will work upon the other ends of the levers in a similar manner.

The motion of the levers thus obtained may be utilized in any desired manner for pumping water, propelling hand-cars, operating fire-engines, or for other purposes.

In operating a pump the piston will be connected to lever $f$ at the point $n$.

I am aware of Patent No. 59,117, and claim no part of the mechanism therein shown or described.

My invention is distinguished from said mechanism by the levers being of different length, by the fulcra of the levers being fixed and located in the middle of the length of the levers, instead of being movable and placed between their middle and ends, and also in the employment of rigid connecting-rods, instead of jointed ones, attached to a crank-shaft located between the levers, so that in my invention the force or pressure applied by the hands on the upper lever is transmitted without intervention and loss to the lower lever, instead of being partly neutralized and wasted.

Having thus described my invention, I claim as new and desire to secure by Letters Patent—

The combination of the foot or treadle lever $c$ and hand-lever $f$, pivoted at the middle of their length on the fixed fulcra $d$ $g$, respectively, and the rigid connecting-rods $b$ $b$, crossed and attached to the levers $c$ $f$ and the standard, as shown and described, to operate as and for the purpose specified.

HERBERT RANDOLPH SAUNDERS.

Witnesses:
FRANK E. RICHEY,
H. M. CHITTENDEN.